(12) United States Patent
Tsolis et al.

(10) Patent No.: US 9,075,877 B2
(45) Date of Patent: Jul. 7, 2015

(54) SYSTEM AND METHOD FOR TRANSPARENT IN-NETWORK ADAPTATION OF RICH INTERNET APPLICATIONS

(75) Inventors: Georgios Tsolis, Patras (GR); Paraskevas Zafiris, Patras (GR); Spyridon Vathis, Patras (GR)

(73) Assignee: Citrix Systems Inc., Fort Lauderdale, FL (US)

(*) Notice: Subject to any disclaimer, the term of this patent is extended or adjusted under 35 U.S.C. 154(b) by 140 days.

(21) Appl. No.: 13/537,434

(22) Filed: Jun. 29, 2012

(65) Prior Publication Data

US 2014/0006548 A1 Jan. 2, 2014

(51) Int. Cl.
G06F 15/16 (2006.01)
G06F 17/30 (2006.01)

(52) U.S. Cl.
CPC .... G06F 17/30861 (2013.01); G06F 17/30905 (2013.01)

(58) Field of Classification Search
CPC ... H04L 67/02; H04L 12/5835; H04L 51/066; H04L 67/2823; H04L 67/28; H04L 67/2819; H04N 21/437; H04N 21/2343; H04N 21/234309; G06F 17/3089; G06F 17/30905
USPC .................. 709/217–219, 236, 246
See application file for complete search history.

(56) References Cited

U.S. PATENT DOCUMENTS

| | | | |
|---|---|---|---|
| 2005/0027823 A1 | 2/2005 | Rana | |
| 2006/0206589 A1* | 9/2006 | Lentini et al. | 709/219 |
| 2009/0106769 A1 | 4/2009 | Nakamura | |
| 2010/0058191 A1 | 3/2010 | Hawkins | |
| 2010/0199197 A1* | 8/2010 | Faletski et al. | 715/760 |
| 2011/0016484 A1 | 1/2011 | Choi | |
| 2011/0099294 A1* | 4/2011 | Kapur et al. | 709/246 |
| 2011/0185038 A1 | 7/2011 | Yoon et al. | |
| 2011/0289546 A1* | 11/2011 | Pieczul et al. | 726/1 |
| 2012/0060087 A1* | 3/2012 | Jame et al. | 715/238 |
| 2013/0041986 A1* | 2/2013 | Colton et al. | 709/219 |
| 2013/0178195 A1* | 7/2013 | Luna et al. | 455/414.1 |
| 2013/0227078 A1* | 8/2013 | Wei et al. | 709/219 |

OTHER PUBLICATIONS

PCT International Search Report and Written Opinion related to Int'l Application No. PCT/US2013/048369; dated (mailed) Oct. 21, 2013, 7 pages.

* cited by examiner

Primary Examiner — Brian J Gillis
Assistant Examiner — Austin Moreau
(74) Attorney, Agent, or Firm — Finnegan, Henderson, Farabow, Garrett & Dunner LLP

(57) ABSTRACT

A system and method that allows Rich Internet Applications content to be adapted for a web browser on a mobile device without requiring an installation of an RIA player. The method comprises receiving processing a request by communicating with the web server to acquire the RIA file and the parameters used to instantiate the RIA file, adapting the RIA content of the RIA file for display in the web browser without requiring an RIA player at the mobile device, and providing adapted RIA content to the web browser.

15 Claims, 5 Drawing Sheets

SYSTEM AND METHOD FOR TRANSPARENT IN-NETWORK ADAPTATION OF RICH INTERNET APPLICATIONS

The embodiments described herein relate to a system and method that allows Rich Internet Applications content to be adapted for a web browser on a mobile device without requiring an installation of an RIA player.

BACKGROUND

The World Wide Web ("Web") is a ubiquitous platform that allows straightforward access to content and information by everyone having access to the Internet worldwide. For that reason, it is nowadays not only a collection of interlinked documents, but also a platform for deploying rich content that is highly interactive, such as animated advertisements, multimedia applications, and games. This category of Web content is typically referred to as Rich Internet Applications ("RIAs" or "Applications").

Early versions of web standards and web browsers did not provide the capabilities required by content authors to produce RIAs. As a result, multimedia vendors used extensibility mechanisms (such as the Netscape™ Plugin API or Microsoft™ ActiveX) that were introduced by web-browser vendors to add the missing capabilities and introduce RIA platforms. Some RIA platforms that have achieved adoption by web-browsers and content authors are Adobe™ Flash, Oracle JavaFX™ and Microsoft™ Silverlight.

RIA platforms extend the web browser by adding capabilities in the following areas: (1) vector/3D graphics and bezier curves; (2) motion, animation, and frame sequences; (3) raster graphics, bitmaps, and filters; (4) blend modes, layers, and clipping; (5) color transforms and gradients; (6) shapes, sprites, and morphing; (7) fonts, text rendering, and globalization; (8) menus, forms, and buttons for interactivity; (9) keyboard input, mouse pointer, and multi-touch; (10) microphone/camera input and accelerometer; (11) video/audio streaming and sound effects; (12) digital rights management; (13) network access, XML/JSON support, and web services; and (14) local storage and scripting support.

Due to the rich capabilities introduced by RIA platforms and the respective disparities in web-browser features, there was a quick and wide adoption of them by the most popular desktop Operating System platforms. The extensions or plug-ins that are installed in web browsers and that add RIA functionality are referred to as RIA players. In parallel, RIA-platform vendors have made available application authoring environments, which are used by developers to produce content that is supported by the RIA players. This has created a powerful ecosystem, which, according to the assessment of RIA platform vendors, has reached 99% of desktop users, millions of content authors and 30-40% of the web sites worldwide.

The typical life cycle of an Application that is based on RIA technologies is as follows:

1) The developer uses the RIA authoring environment to develop applications. These are stored in a file format supported by the authoring environment, but not meant for redistribution to end-user RIA players. Multimedia content, such as images, videos, sounds, fonts, etc. is typically stored in its original format. This material is typically referred to as "Assets". The application logic is implemented using "Scripts", in the language supported by the RIA platform (e.g., ActionScript for the case of Adobe Flash, JavaFX Script for the case of Oracle JavaFX and any .NET dialect for the case of Microsoft Silverlight).

2) After the Application is ready for publishing, the developer uses the RIA authoring environment to generate a representation that is appropriate for posting to a Web Server. Real examples are SWF files (for the case of Adobe Flash), JAR files (for the case of Oracle JavaFX) and XAP files (for the case of Microsoft Silverlight). When in this format, Assets are represented in a compact format and application logic is efficiently encoded, as a series of tags or bytecode, targeting the Player "Runtime" or "Virtual Machine". The result is compressed.

3) The above compact representation ("File") is posted to a Web Server. The Web Page that will embed the Application adds a reference to the File using a Hyper Text Markup Language (HTML) <embed> or <object> element, which identifies it using a Uniform Resource Locator ("URL") and specifies the type of RIA player that needs to be instantiated by the web browser using a MIME-Type, or a Class-ID. The <embed> or <object> element typically also declares the screen dimensions of the RIA application and includes "Parameters" that are necessary for initializing it.

4) After the end-user opens the web page in the web browser of his Internet device ("Device"), the web browser downloads the HTML representation of the web page, encounters the <embed> or <object> element and attempts to instantiate the RIA Player that is installed and registered for handling the declared MIME-Type (or Class-ID). If such an RIA Player is not installed, the end-user is prompted to download and install such a web-browser extension or plug-in.

5) After the RIA player is instantiated, the web browser fetches the RIA File that is identified via the URL and provides it to the RIA Player, alongside the Parameters supplied by the <embed> or <object> element. The web browser also reserves screen area to be used by the RIA player, as specified by the relevant dimensions. The RIA player then interprets and plays the RIA File, executing the included tags or bytecode and displaying (or playing) the Assets embedded in it.

6) The end-user interacts with the Application using input devices (keyboard, mouse, touch screen, camera, microphone, etc.) and the Application uses output devices (screen, sound system, network card, etc.) to interact with the end-user, or with other elements. This interaction is implemented by the Player Runtime, whereas the application logic is executed by the Player Virtual Machine. Access to Device resources is controlled by the "Sandbox" environment of the Browser and Operating System, which ascertains the security of the platform.

7) After the end-user moves away from the Web Page, the Application instance is terminated, as is the case with the Player instance that was instantiated by the Browser to execute the Application.

Despite the broad adoption on desktop Internet devices, proprietary RIA platforms have not achieved the same level of proliferation on mobile devices. According to RIA vendor estimates, while RIA players have reached some smartphones, there are important platforms that lack support. And for those having RIA players, there is feature disparity in comparison to the Desktop or Laptop Device versions of these platforms. Moreover, the product development investments required by RIA vendors to make RIA players available across the fragmented space of mobile devices and browsers are not considered to be sustainable, given the fact that these vendors receive revenue primarily by selling content authoring applications, and not through embedding their Players to Mobile Device platforms.

DETAILED DESCRIPTION

Reference will now be made in detail to the exemplary embodiments illustrated in the accompanying drawings. Wherever possible, the same reference numbers will be used throughout the drawings to refer to the same or like parts.

The present disclosure relates to a system and method that allows RIA content to be adapted for a mobile device that does not require an installed RIA player in a web browser to display the adapted content.

RIA platforms can extend the capabilities of a web browser by adding capabilities in areas such as graphics and video. The additional capabilities are typically supported by RIA players, which are extensions or plug-ins installed in the web browser.

Due to their numerous and rich capabilities, RIA platforms have been widely adopted on desktop devices such as personal computers. On the other hand, RIA platforms have not been as widely adopted in mobile devices when compared to desktop devices. This is because some operating systems in the mobile space do not currently support other RIA platforms, and do not permit RIA players to be installed on mobile devices running those systems. As a result, only a limited amount of RIA content can be displayed on those mobile devices.

The system and method described herein can allow RIA content to be adapted for a mobile device without requiring an installed RIA player in a web browser to display the adaptation. The adaptation can be based on web standards. Also, an Internet gateway can allow transparent in-network adaptation of RIA content without requiring any modification to the web browser, mobile device, web server, or RIA content. To achieve transparent in-network conversion of RIA content, the Internet gateway can be implemented as an in-line network element located between a user and a web server.

Figure 1:
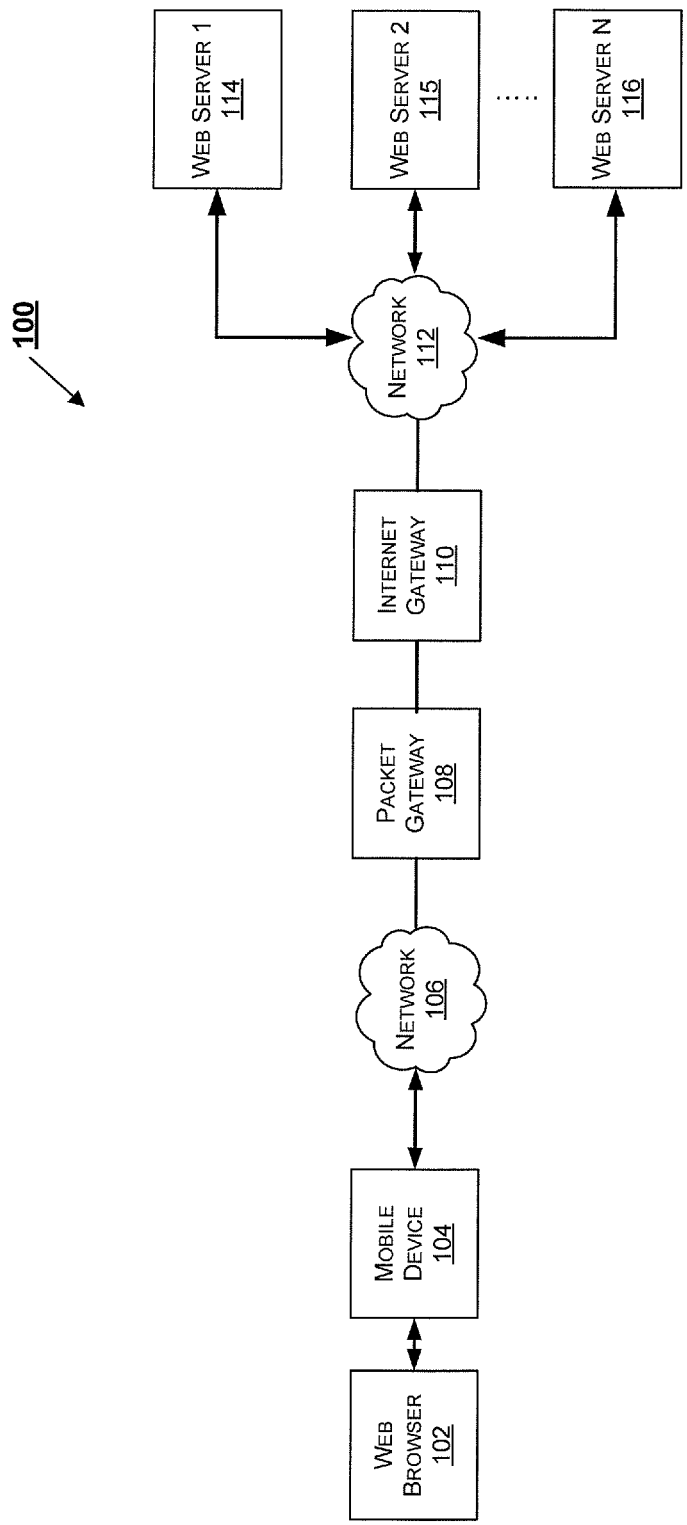
FIG. 1 is a block diagram of an exemplary system.

FIG. 1 is a block diagram of an exemplary system. Exemplary system 100 can be any type of system that transmits data over a network. For example, the exemplary system can include a web browser accessing information from web servers (e.g., content servers) through the Internet. The exemplary system can include, among other things, a web browser 102, a mobile device 104, one or more networks 106, 112, a packet gateway 108, an Internet gateway 110, and one or more web servers 114-116.

Web browser 102 is a user-agent application used with a network protocol. Web browser 102 can be used to access the Internet by implementing a client-side of the primary web protocol—the Hypertext Transfer Protocol (HTTP). Web browser 102 can be a software program that transmits requests to a web server and receives responses to those requests. For example, web browser 102 can send a request to web servers 114-116 for a particular file or object of a web page, and the web server(s) hosting the web page can query the object in a database and can send back the object as part of a response to the web browser. This process continues until every object in the web page has been downloaded to the web browser.

Mobile device 104 is a device that is capable of sending wireless transmissions and receiving data. Mobile device 104 can be used by a user to access the Internet. For example, mobile device 104 can receive a Uniform Resource Locator (URL) request from web browser 102, and can receive a response to the request from the web server. Mobile device 104 can include, among other things, smartphones, cellphones, personal digital assistants (PDAs), and tablet computers. Mobile device 104 can also include, but is not limited to, a combination of telecommunications hardware equipment, operating system software, and application software.

Networks 106 and 112 can include Local Area Networks (LANs) and/or Wide Area Networks (WANs), and can be wireless, wired, or a combination thereof. The networks can extend onto the Internet, or it can be peer-to-peer networks. The networks can also include data networks such as a cloud computing network.

In some embodiments, network 106 can include a portion of a mobile network operator's network. For example, network 106 can be based on mobile data protocols such as General Packet Radio Services (GPRS), Enhanced Data GSM Environment (EDGE), 3G, and Long Term Evolution (LTE) protocols. The 3G protocols can include Universal Mobile Telecommunication Service (UMTS), Wideband Code-Division Multiple Access (WCDMA), High-Speed Downlink Packet Access (HSDPA), and Evolution Data Optimized (EVDO).

Packet gateway 108 is a network element that can translate mobile data protocols into Internet protocols (e.g., TCP/IP), and vice versa.

Internet gateway 110 is an architecture that is implemented as an in-line network element located between packet gateway 108 and network 112. Internet gateway 110 can allow RIA content to be adapted for mobile device 104 without requiring an installed RIA player in web browser 102 to display the adapted content.

Web servers 114-116 are servers that receive the requests from web browser 102 and return the requests back to web browser 102. Web servers 114-116 can be any computer system or software program that is capable of serving clients' requests. Web servers 114-116 can be a content server, a media server, an enterprise server, application server, communication server, database server, proxy server, caching server, or any other type of server. In addition, web servers 114-116 can include a broadcasting facility, such as free-to-air, cable, satellite, and other broadcasting facility, for distributing data.

Figure 2:
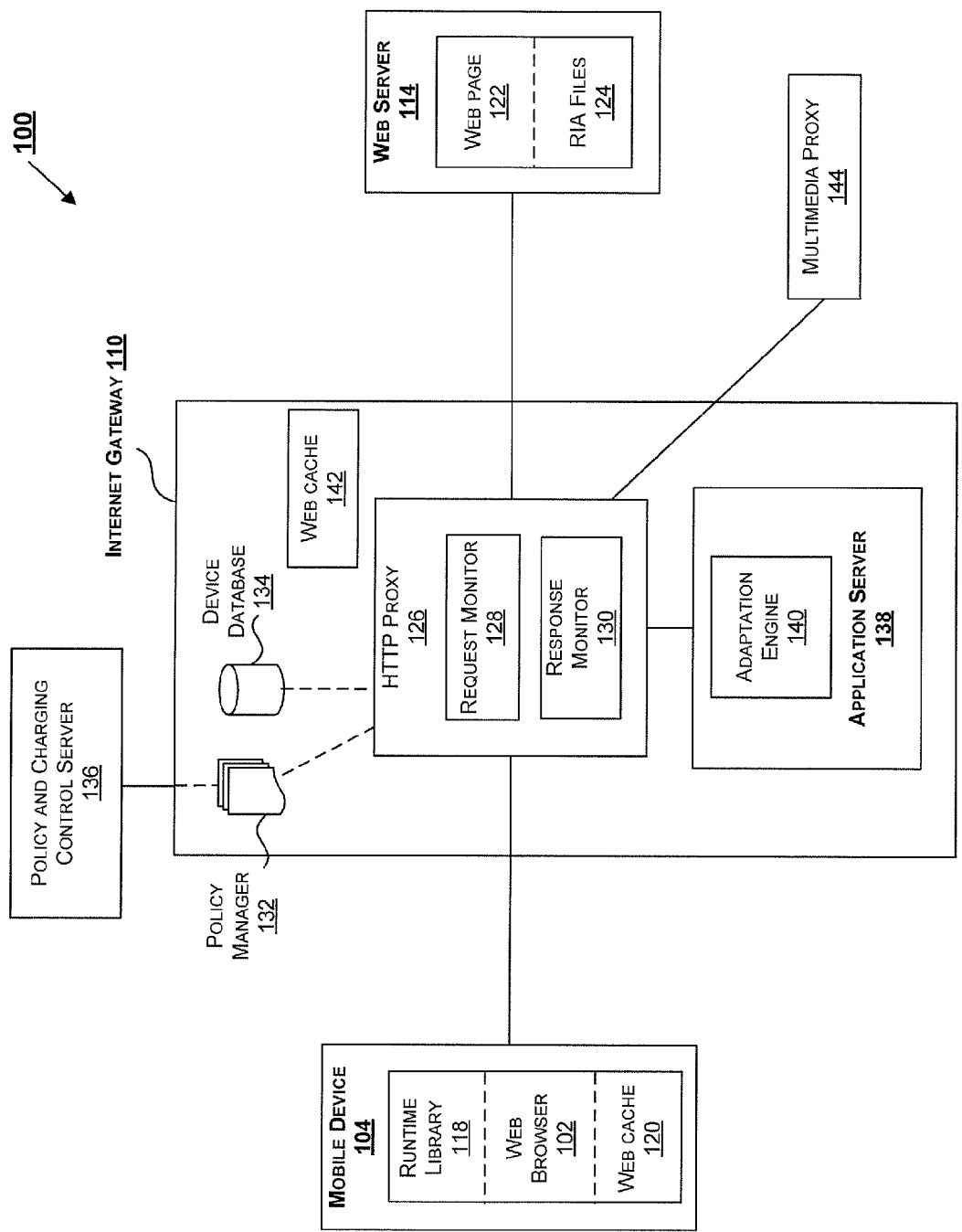
FIG. 2 is a block diagram of the exemplary system of FIG. 1 in accordance with some embodiments.

FIG. 2 is a block diagram illustrating an embodiment of the exemplary system of FIG. 1. Mobile device 104 can include web browser 102. Mobile device 104 can also include, among other things, a runtime library 118 and a web cache 120.

Runtime library 118 is a library of scripts written in a computer language (e.g., JavaScript™). The scripts can be supported by web browser 102. Runtime library 118 can also implement common and reusable portions of adapted RIA content. Runtime library 118 can be stored in a memory (e.g., web cache 120) within mobile device 104.

Web cache 120 is a memory element that can be associated with web browser 102 and runtime library 118. Runtime library scripts can be stored (or cached) in web cache 120. When runtime library scripts are cached, the scripts can be reused across different web pages running the same scripts. As a result, the scripts need not be downloaded each time those web pages are accessed.

Web servers 114-116 may include, among other things, one or more web pages 122, and one or more RIA files 124. For simplicity, only web server 114 is shown in FIG. 2, but it is appreciated that multiple web servers could be used. For example, one web server could include a web page, while another web server could include an RIA file associated with the web page.

Web server 114 can include network elements that implement the server-side of the primary web protocol (HTTP). The network elements host the content of websites, which is typically delivered on one or more web pages 122. Web page 122 can be located at one single web server 114, or web page 122 can be located at multiple web servers 114-116.

Web page 122 may include objects such as a combination of markup files (HTML), images (GIF, JPEG, PNG), style sheets (CSS), scripts, etc. The objects can be displayed on a web browser (e.g., web browser 102) as a single web page or as multiple web pages. Also, objects in web page 122 need not be located at one web server 114. In some cases, the objects can be spread onto multiple web servers 114-116 for the purpose of reducing server load, or for the purpose of using third party advertisements.

RIA files 124 are compact representations of RIA content created by content authors for distribution to user-agents (e.g., web browser 102). RIA files 124 are typically referenced as URLs through the use of HTML <embed> or <object> elements on one or more web pages 122. In some cases, the HTML <embed> or <object> elements that reference the RIA files are generated by scripts that are part of web pages 122, executed by web browser 102.

Internet gateway 110 can include, among other things, an HTTP proxy 126, a policy manager 132, a device database 134, an application server 138, and a web cache 142.

HTTP proxy 126 serves as an intermediary between mobile device 104 and web server 114. HTTP proxy 126 can intercept HTTP protocol exchanges, and further manipulate the exchanges by providing services such as optimizing, adapting, redirecting, filtering, etc. of data or requests for content.

HTTP proxy 126 can further include a request monitor 128 and a response monitor 130. Request monitor 128 can receive HTTP requests, analyze the HTTP requests, and route the HTTP requests to other elements in system 100. Response monitor 130 can receive and intercept HTTP responses, and route the HTTP responses to web browser 102.

Policy manager 132 can store policy rules that enable or configure the various services delivered by Internet gateway 110 on the intercepted protocol exchanges. These policy rules can include evaluating a subscriber or session information to determine if a transaction is eligible for RIA content adaptation. The transaction can include, among other things, a URL request for a particular web page 122 that links to one or more RIA files 124.

In some embodiments, policy manager 132 can retrieve policies and other information from a policy and charging control server 136 that is located outside of Internet gateway 110. Policy and charging control server 136 may belong to a network infrastructure of a mobile network operator (e.g., AT&T™, Verizon™, etc.). Policy and charging control server 136 can manage and maintain information about the mobile network subscribers and mobile sessions handled by the mobile network operator. Policy and charging control server 136 can be a database server, caching server, and any other suitable servers. Policy and charging control server 136 can be computer programmed to accept requests (e.g., RADIUS, DIAMETER, LDAP, or other protocols that can initiate data transmission) from policy manager 132, and serve policy manager 132 with the requested data. In addition, policy and charging control server 136 can include a broadcasting facility, such as free-to-air, cable, satellite, and other broadcasting facility, for distributing data.

Device database 134 can store information for identifying different mobile devices 104 (e.g., different types of smartphones, or mobile devices running on different networks or mobile data protocols). Device database 134 can configure and deliver services to a user according to the mobile device that the user carries.

Application server 138 is a component configured to execute scripts of a standard scripting language. Application server 138 can include an adaptation engine 140. Adaptation engine 140 adapts (which includes converts) content in RIA files 124 into a format that is viewable on web browser 102 without requiring installation of an RIA player. The adaptation of content in one RIA file corresponds to a single instance of adaptation engine 140. In some embodiments, multiple instances of adaptation engine 140 can be executed by application server 138 at any time. Subsequently, multiple requests for adaptation can be load balanced across the multiple instances of adaptation engine 140. In some embodiments, the adaptation engine instances can be continuously checked to ensure that instances are not failing due to application server overload, and to automatically restart instances that have failed.

Web cache 142 can store runtime library scripts. Web cache 142 can also store RIA files 124 received from web server 114. When runtime library scripts and RIA files 124 are stored in web cache 142, the scripts and files can be reused across different web pages running the same scripts and files, and need not be downloaded each time the different web pages are accessed. Web cache 142 can also store the adapted output generated by adaptation engine 140. Web cache 142 can also store objects web pages 122 consist of, if allowed by web servers 114.

In some embodiments, Internet gateway 110 may include and/or communicate with multimedia proxy 144. Multimedia proxy 144 is an element that can be added or linked to Internet gateway 110. Multimedia proxy 144 can adapt any RIA video and audio protocols (and other formats) into a format viewable on web browser 102 without requiring that an RIA player be installed on mobile device 104.

Each of mobile device 104, Internet gateway 110, web server 114, policy and charging server 136, and multimedia proxy 144 includes one or more processors and at least one memory for storing program instructions, and one or more applications that reside on the memory and which are executable by the processor(s). The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the instructions can be implemented in hardware components or combinations of hardware and software such as, for example, ASICs, special purpose computers, or general purpose computers.

Although particular computing, mobile devices, and networks are illustrated and described, it is to be appreciated and understood that other computing, mobile devices, and networks can be utilized without departing from the spirit and scope of the embodiments described herein.

Figure 3:
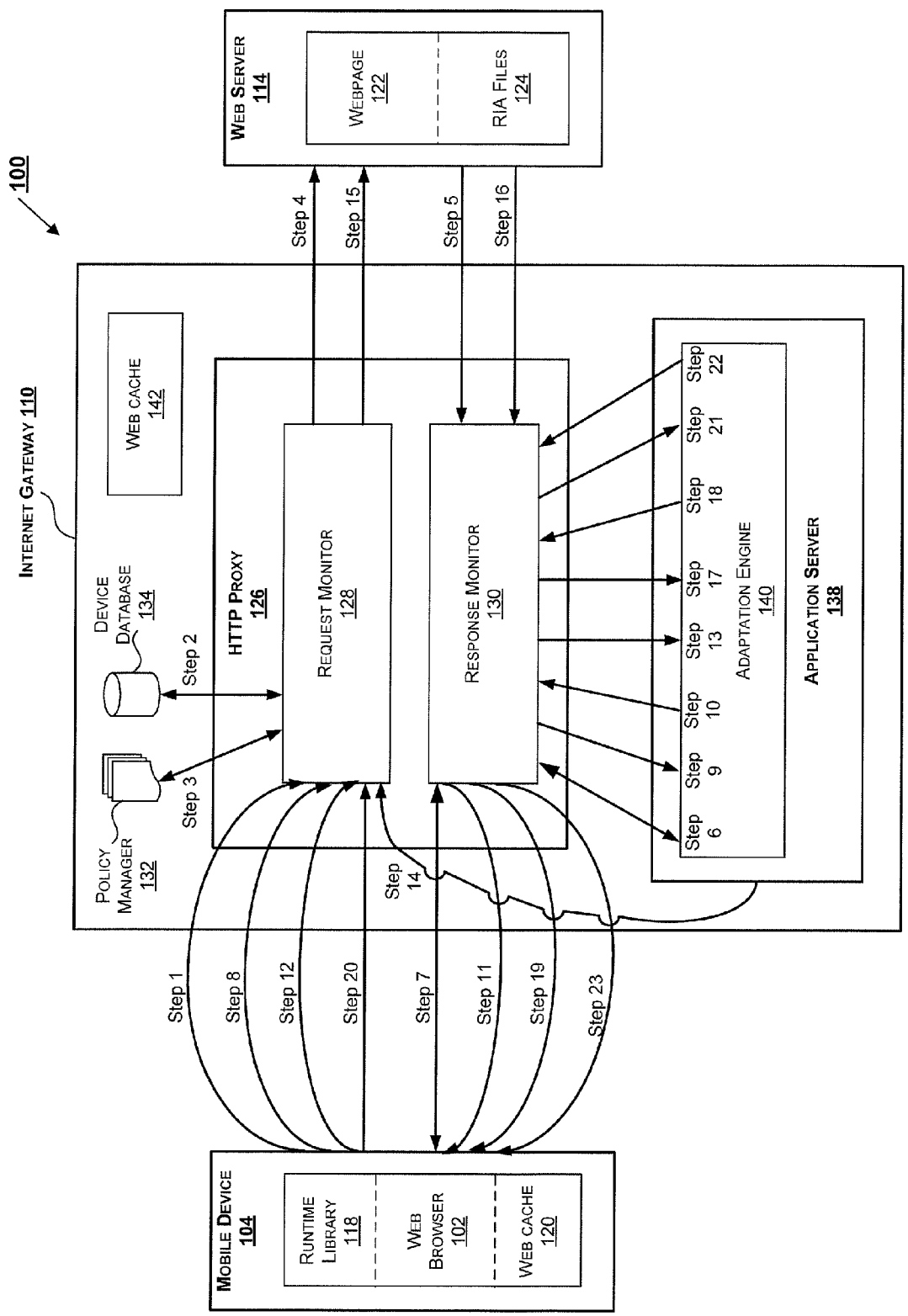
FIG. 3 is a functional block diagram of FIG. 2 illustrating exemplary communication flows.

FIG. 3 is an exemplary functional block diagram illustrating an exemplary communication flow in the system of FIG. 2. FIG. 3 illustrates the transparent in-network adaptation or conversion of RIA content into an equivalent or alternate web standards-based representation using an Internet gateway in accordance with some embodiments. The adaptation or conversion of RIA content is hereinafter referred to as "adaptation service." The modules shown in FIG. 3 can generally be categorized into the following components: (1) mobile device 104; (2) Internet gateway 110; and (3) web server 114. While a single component for each of the above has been displayed for purposes of simplifying the explanation of this exemplary communication flow, any number of components could be provided.

A user requests web page 122 by entering a URL in web browser 102. Mobile device 104 establishes packet data connectivity with network 106, and sends an HTTP (GET) request to web server 114, which hosts web page 122. The HTTP (GET) request propagates through network 106 and reaches Internet gateway 110, where the HTTP (GET) request is received at request monitor 128 (step 1).

In steps 2 and 3, request monitor 128 determines whether certain conditions based on information that is carried in the HTTP (GET) request are met. For example, request monitor 128 can evaluate the user's subscriber information and/or current web session information using policy manager 132 to determine if the HTTP transaction (e.g., URL request for web page 122) is permitted to receive the adaptation service (step 2). Request monitor 128 can also match information relating to mobile device 104 and web browser 102 against device database 134 to determine if mobile device 104 is eligible for the adaptation service, and if web browser 102 can support the adaptation service (step 3). If request monitor 128 determines the above conditions are met, HTTP proxy 126 can then enable the adaptation service for the HTTP transaction, mobile device, and web browser.

Next, request monitor 128 forwards the HTTP (GET) request to web server 114 through network 112 (step 4). After web server 114 has received the HTTP (GET) request, web server 114 identifies a web page HTML markup object corresponding to the URL of requested web page 122. The webpage HTML markup object can include one or more references to RIA files 124 in the form of <embed> or <object> elements. The webpage HTML markup object can also include one or more scripts that generate such reference or references to RIA files 124 when the scripts are executed by web browser 102.

Web server 114 then returns the web page HTML markup object in an HTTP response to response monitor 130 (step 5). Assuming HTTP proxy 126 has enabled the adaptation service, HTTP proxy 126 can modify the HTTP response by inserting a reference to an RIA discovery script into the HTTP response. In this exemplary embodiment, the RIA discovery script is hosted together with other runtime library scripts on application server 138. In other embodiments, the RIA discovery script can be deployed separately in another server outside of Internet gateway 110. Regardless of the location of application server 138, response monitor 130 can retrieve the reference from adaptation engine 140 (step 6). In some embodiments, response monitor can insert the reference without communicating with either adaptation engine 140 or application server 138.

The RIA discovery script is a runtime library script that, when executed in web browser 102, can discover RIA files 124 that have been referenced in the web page HTML markup object. The RIA discovery script can also imitate the behavior of an RIA player to push web browser 102 to instantiate RIA files 124. By imitating the behavior of an RIA player, the RIA discovery script can discover attempted instantiations of RIA files 124 on web browser 102, rather than actual instantiations of the files.

It is to be appreciated that runtime library scripts such as the RIA discovery script can be cached in web caches 120 and 142. After the runtime library scripts are cached, the scripts can be reused across different web pages 122 running the same scripts, and need not be downloaded each time the different web pages 122 are accessed.

After the HTTP response has been modified, response monitor 130 returns the modified HTTP response to web browser 102 (step 7). The modified HTTP response propagates via network 106 and reaches mobile device 104, which delivers the response to web browser 102.

After the modified HTTP response has been received, web browser 102 displays web page 122, and downloads scripts (as well as image objects, style sheets, etc.) that have been referenced in the modified HTTP response. Web browser 102 can also retrieve, among other things, the RIA discovery script referenced in the modified HTTP response by requesting the RIA discovery script from application server 138 (or another server) via HTTP proxy 126 (steps 6 and 7). It is to be appreciated that web browser 102 can retrieve the RIA discovery script directly from web cache 120 if the script has been retrieved in a previous session.

After the RIA discovery script is executed in web browser 102, the RIA discovery script identifies attempted instantiations of RIA files 124 on the web browser, and generates an HTTP (POST) request for each attempted instantiation. Each HTTP (POST) request carries the URL of an RIA file 124 and the parameters used to instantiate the file.

In some instances, web page 122 can include multiple RIA files 124. In those instances, it may be more efficient to process a single HTTP (POST) request based on a single web page 122 rather than for each RIA file 124. Thus, in some embodiments, the URLs of multiple RIA files 124 and the parameters used to instantiate those files can be merged into a single HTTP (POST) request.

The HTTP (POST) requests can be sent to adaptation engine 140 by web browser 102 using an XMLHTTPRequest. First the HTTP (POST) requests are received at request monitor 128 by intercepting these requests (step 8). Based on special domain matching, HTTP proxy 128 redirects the HTTP (POST) requests to adaptation engine 140 (step 9).

Adaptation engine 140 then generates a first unique identifier for each RIA file 124 referenced in the HTTP (POST) requests, the first unique identifier hereinafter referred to as "instance identifier". The instance identifier can be based on the user's subscriber information, URL of each RIA file 124, and the parameters used to instantiate each RIA file. Next, adaptation engine 140 generates an HTTP (POST) response and includes the instance identifier in the HTTP (POST) response. In some embodiments, if multiple RIA entries (i.e. URLs and parameters for multiple RIA files 124) have been merged into a single HTTP (POST) request, adaptation engine 140 can generate instance identifiers for the multiple RIA entries and include the instance identifiers in a single HTTP (POST) response. Moreover, adaptation engine associates the RIA file instance with the instance identifier. This association could be based on the unique identifier itself, or a mapping could occur linking the RIA file and the other instance parameters with the instance identifier. For example, adaptation engine 140 could generate a lookup table that maps the instance identifier to the URL of RIA file, the instance parameters, as well as the second unique identifier—see below.

Next, adaptation engine 140 sends the HTTP (POST) response to response monitor 130 (step 10), which sends the response to web browser 102 (step 11). The one or more instance identifiers in the response will be provided to the RIA discovery script. After receiving the instance identifier for each application file 106, the RIA discovery script replaces the RIA instances on web page 122 with inline HTML frames, one for each RIA instance. The RIA discovery script also sets the source of each of the inline HTML frames to a configurable special domain destination URL, appending as argument the value of the instance identifier of the respective RIA instance. Using a special domain that is distinct from the URLs of web pages 122 provides the advantage of cross-domain security, enabling the same-origin policy of web browser 102 to isolate adapted content from surrounding web pages 122.

After web browser 102 has executed the RIA discovery script, web browser 102 sends HTTP (GET) requests to the special domain URL for each inline HTML frame, and the HTTP (GET) requests are intercepted by request monitor 128 (step 12). Based on special domain matching, HTTP proxy 126 redirects the HTTP (GET) requests to application server 138 (step 13), where adaptation engine 140 generates an HTML markup for each inline HTML frame corresponding to each RIA instance.

As stated previously, at step 9, adaptation engine 140 received information regarding the URL location of the RIA files. Using this information, adaptation engine 140 initiates an HTTP (GET) request towards the web servers specified in the URL of RIA files (in this case, web server 114). The HTTP (GET) requests are first intercepted by request monitor 128 (step 14), which then sends the request to web server 114 (step 15). By sending the HTTP (GET) requests via HTTP proxy 126, transparency of the source IP address (for example, the IP address of mobile device 104) can be maintained.

After web server 114 has received the HTTP (GET) requests, web server 114 102 returns RIA files 124 to application server 138 via HTTP proxy 126 (steps 16 and 17). First, web server 114 provides RIA files 124 to response monitor 130 (step 16), which redirects RIA files 124 to application server 138 (step 17). It is noted that RIA files 124 received from web server 114 can be stored in web cache 142, as specified by cache-related response headers, and can be retrieved from web cache 142 when the RIA files are subsequently requested by the same user or by other users.

Next, adaptation engine 140 analyzes redirected RIA files 124 and generates a second unique identifier for each RIA file 124, the second unique identifier hereinafter referred to as "content identifier". The content identifier identifies the content of each RIA file 124 that is to be adapted, whereas the instance identifier represents a specific instantiation of each RIA file 124. For example, an exemplary RIA file 124 can have multiple instantiations (by different users/subscribers), each of which are denoted by a different instance identifier. On the other hand, there is only one content identifier for the exemplary RIA file 124, because the content of the file remains the same even though the file may be instantiated by different users.

Steps 14-17 can proceed in parallel with steps 11-13. In some embodiments, if a content identifier identifying the RIA file contents already exists at internet gateway 110 and if the RIA files are accessible via web cache 142 (for example), adaptation engine 138 can forego steps 14-17.

After the content identifiers have been generated and the HTTP requests for the inline HTML frames have arrived at adaptation engine 140, the adaptation engine creates an association between the instance identifiers and the content identifiers. The association between the instance and content identifiers could be linked with the association between the RIA file and the instance identifiers mentioned above. The association between the instance and content identifiers could be based on a mapping linking the two identifiers or could be based on separate mapping between the RIA file (or some representation of the RIA file) and the content identifier. For example, adaptation engine 140 could generate a lookup table that maps the instance identifier with the URL of the RIA file, the instance parameters and the content identifier. The adaptation engine 140 could also generate two lookup tables, with one table having an association between the instance identifier, the RIA-file URL and the instance parameters, and the other table having an association between the RIA-file URL and the content identifier.

Next, the adaptation engine generates markup and scripts for each inline HTML frame in an HTTP response. The markup and scripts in the HTTP response, when executed in web browser 102, can instantiate a web worker to consume the RIA content identified denoted by the content identifiers. The markup can further include references to additional runtime library scripts (for example, scripts that implement common portions of output representation parts of the adapted RIA content, or of a respective virtual machine). In some embodiments, to allow cross-domain requests from within internal inline frames, the HTTP response can carry an appropriate Access-Control-Allow-Origin (CORS) HTTP header.

Next, adaptation engine 140 sends the HTTP response (containing the markup and scripts) to response monitor 130 (step 18), which provides the response to web browser 102 (step 19). After the HTTP response has been received, web browser 102 displays each inline HTML frame, instantiates a web worker, and retrieves the runtime library scripts (if runtime library scripts have not been previously downloaded). Web browser 102 also initiates the download of adapted RIA content (identified by the content identifiers) by sending a HTTP request to application server 138 for the adapted RIA content. The HTTP request is first intercepted by request monitor 128 (step 20), and redirected by HTTP proxy 126 to adaptation engine 140 (step 21).

Next, adaptation engine 140 processes RIA files 124 by adapting the content of the RIA files for display in web browser 102 without requiring that an RIA player be installed at mobile device 104. The adaptation service can use web standards, e.g., HTML 5, JavaScript, Scalable Vector Graphics (SVG), Web Apps WG (e.g., Web Workers, XMLHTTPRequest), and Synchronized Multimedia Integration Language (SMIL). As part of the adaptation service, adaptation engine 140 extracts assets (e.g., multimedia content, such as images, videos, sounds, fonts, etc.) from RIA files 124 and stores the assets in a browser-friendly format (e.g., GIF, JPEG, PNG, etc.). Adaptation engine 140 can also process bytecode in RIA files 124 to generate scripts that can utilize runtime libraries. All adapted content can be cached locally (e.g., in web cache 142) for subsequent re-use, which can minimize access latency and further reduce resource utilization requirements on Internet gateway 110.

After RIA files 124 have been adapted, adaptation engine 140 sends the adapted content to response monitor 130 (step 22), which returns the adapted content to web browser 102 (step 23). After the adapted content has been received, web browser 102 displays the adapted content in the respective inline HTML frame, which can simulate the capabilities of an RIA player and replicate the presentation and interactivity of RIA files 124. It is assumed that the adapted content can be supported by the web standards and the capabilities of web browser 102.

The above framework described in steps 1-23 can be extended to other types of services. For example, in some embodiments, if RIA files 124 consume video/audio content provided by a media server, Internet gateway 110 can be supplemented with a multimedia proxy 144 (shown in FIG. 2) to adapt the RIA content in those files. In some other embodiments, the RIA discovery script can roll back to alternate content (provided by the content author) if adaptation engine 140 experiences any issue in the processing of RIA files 124 (e.g., processing a corrupted or invalid application file, etc.).

Figure 4:
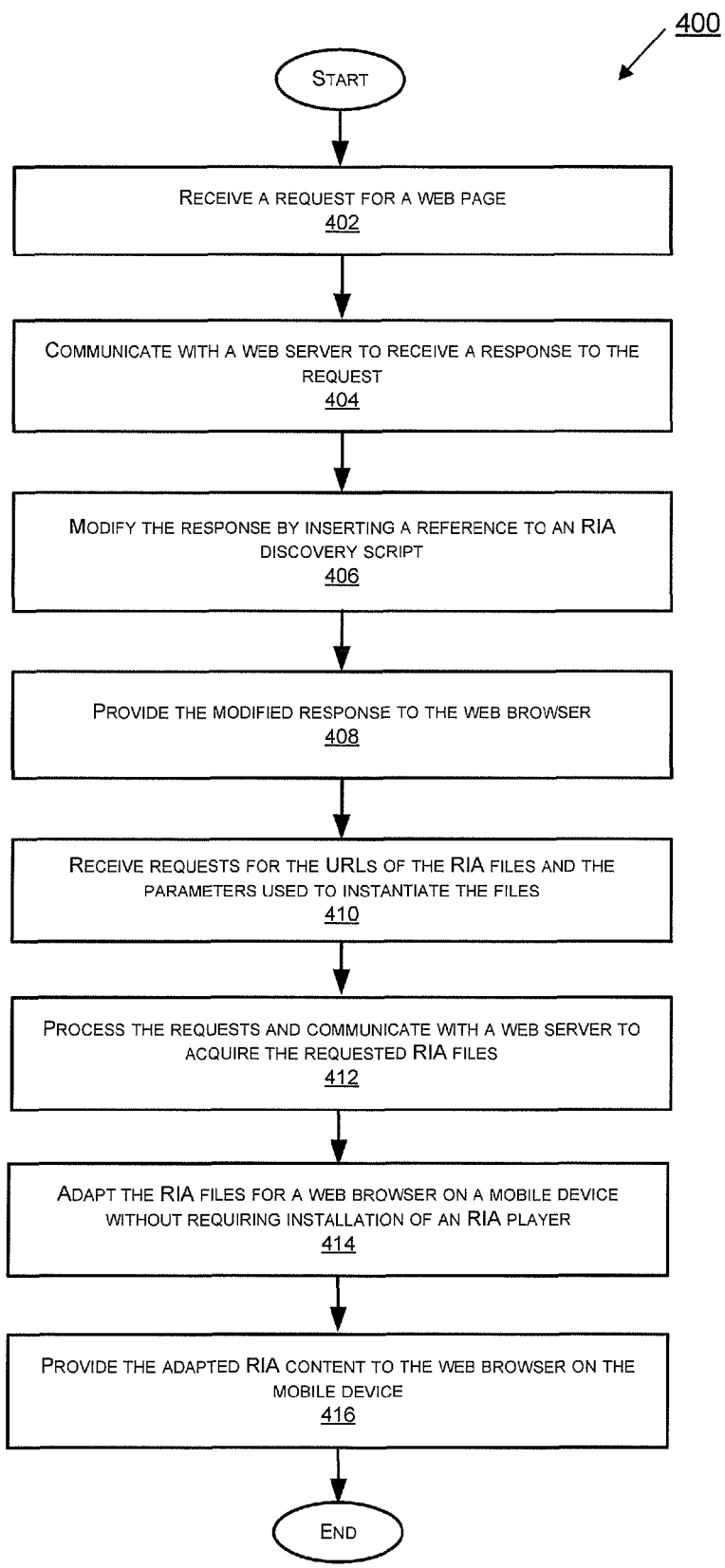
FIG. 4 is a flow chart illustrating an exemplary method for implementing the transparent in-network adaptation of RIA content for a mobile device in accordance with some embodiments.

FIG. 4 is a flow chart illustrating an exemplary method for implementing the transparent in-network adaptation of RIA content for a mobile device in accordance with some embodiments. While the flowchart discloses the following steps in a particular order, it is appreciated that at least some of the steps can be moved, modified, combined, or deleted where appropriate.

After the initial start step, an Internet gateway (e.g., Internet gateway 122) receives a request for a web page (e.g., web page 122) from a web browser (e.g., web browser 102) (402). The request can be an HTTP (GET) request that is submitted to a web server (e.g., web server 114) when a user enters a URL in the web browser. The request can be routed through an HTTP proxy (e.g., HTTP proxy 126) in the Internet gateway. In some embodiments, the request is received at a request monitor (e.g., request monitor 128) in the HTTP proxy.

In some embodiments, the request monitor determines whether certain conditions based on information that is carried in the HTTP (GET) request are met. For example, the request monitor can evaluate the user's subscriber information and/or current web session information using a policy manager (e.g., policy manager 132) to determine if the HTTP transaction (e.g., URL request) is permitted to receive the adaptation service. The request monitor can also match information relating to the mobile device and the web browser against a device database (e.g., device database 134) to determine if the mobile device is eligible for the adaptation service, and if the web browser can support the adaptation service. If the request monitor determines the above conditions are met, the HTTP proxy may then enable the adaptation service for the HTTP transaction, mobile device, and web browser.

Next, the Internet gateway communicates with the web server to receive a response to the request (404). In some embodiments, the response can be received by a response monitor (e.g., response monitor 130) in the HTTP proxy. The response can be an HTTP response, and can include a webpage HTML markup object corresponding to the URL of the requested web page. The webpage HTML markup object can include one or more references to RIA files (e.g., RIA files 124) that are on the web page in the form of <embed> or <object> elements. The webpage HTML markup object can also include one or more scripts that generate such reference or references to the RIA files when the scripts are executed by the web browser.

After receiving the response, the HTTP proxy modifies the response by inserting a reference to an RIA discovery script (406). The RIA discovery script is a runtime library script that, when executed in the web browser, can discover the RIA files that have been referenced in the web page HTML markup object. The RIA discovery script can imitate the behavior of an RIA player to push the web browser to instantiate the RIA files. By imitating the behavior of an RIA player, the RIA discovery script can discover attempted instantiations of the RIA files on the web browser, rather than actual instantiations of the files.

The RIA discovery script can be hosted together with other runtime library scripts on an application server (e.g., application server 138) in the Internet gateway. In some embodiments, the RIA discovery script can be deployed separately in another server outside of the Internet gateway. It is to be appreciated that runtime library scripts such as the RIA discovery script can also be cached in web caches in the mobile device and/or the Internet gateway (e.g., web caches 120 and/or 142). When the runtime library scripts are cached, the scripts can be reused across different web pages running the same scripts, and need not be downloaded each time the different web pages are accessed.

Next, the HTTP proxy provides the modified response to the web browser (408). After the modified HTTP response has been received by the web browser, the web browser displays the requested web page, and downloads referenced scripts (as well as image objects, style sheets, etc.) that have been referenced in the modified HTTP response via the HTTP proxy. The web browser can also retrieve, among other things, the RIA discovery script referenced in the modified HTTP response by downloading the RIA discovery script from the application server (or another server) via the HTTP proxy. It is to be appreciated that the web browser can retrieve the RIA discovery script directly from a web cache in the mobile device if the script has been retrieved in a previous session.

Next, the Internet gateway (or HTTP proxy) receives a request for the URLs of the RIA files and the parameters used to instantiate the files (410). In some embodiments, the request is received at the request monitor. The request can be an HTTP (POST) request generated by the RIA discovery script when the RIA discovery script is executed in the web browser. The RIA discovery script identifies attempted instantiations of the RIA files on the web browser, and generates an HTTP (POST) request for each attempted instantiation. Each HTTP (POST) request carries the URL of an RIA file and the parameters used to instantiate the file.

Typically, the Internet gateway will receive multiple HTTP (POST) requests if the web page includes multiple RIA files. To improve efficiency, in some embodiments, the RIA discovery script can send a single HTTP (POST) request based on a single web page rather than for each RIA file. Thus, in those embodiments, the Internet gateway can receive the URLs of multiple RIA files and the parameters used to instantiate those files in a single HTTP (POST) request.

Next, the Internet gateway processes the HTTP (POST) requests and communicates with the web server to acquire the requested RIA files (412). After the RIA files have been acquired, the Internet gateway adapts the RIA files for the web browser on the mobile device without requiring installation of an RIA player (414). After the RIA files have been adapted, the Internet gateway provides the adapted RIA content to the mobile device (416).

Figure 5:
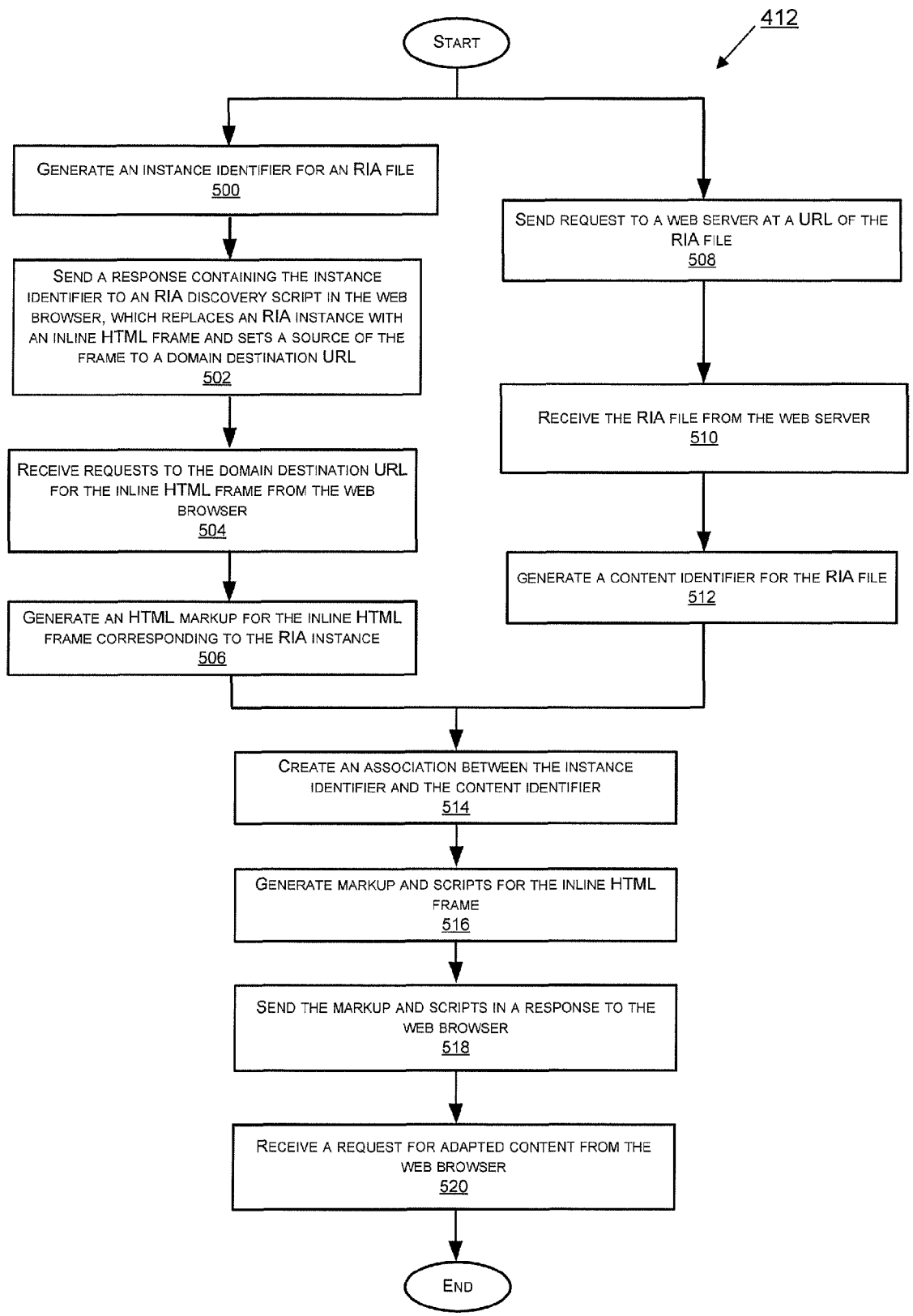
FIG. 5 is a flow chart of an exemplary method illustrating further details of the adaptation of RIA content of FIG. 4.

FIG. 5 is a flow chart illustrating an exemplary method for processing the HTTP (POST) requests and acquisition of the RIA files at step 412 of FIG. 4. While the flowchart discloses the following steps in a particular order, it is appreciated that at least some of the steps can be moved, modified, combined, or deleted where appropriate. As noted previously, the Internet gateway processes an HTTP (POST) request at step 412. These requests are received from a web browser through an XMLHTTPRequest.

An adaptation engine (e.g., adaptation engine 140) in the application server generates a first unique identifier for each RIA file referenced in the HTTP (POST) requests (500), the first unique identifier hereinafter referred to as "instance identifier". The instance identifier can be based on the user's subscriber information, URL of each RIA file, and the parameters used to instantiate each RIA file. Next, the adaptation engine generates an HTTP (POST) response and stores the instance identifiers in the HTTP (POST) response. In some embodiments, if multiple RIA entries have been merged into a single HTTP (POST) request, the adaptation engine can generate instance identifiers for the multiple RIA entries and store the instance identifiers in a single HTTP (POST) response.

Next, the adaptation engine sends the HTTP (POST) response containing the instance identifiers to the RIA discovery script in the web browser (502) via the HTTP proxy. After receiving the instance identifier for each RIA file, the RIA discovery script replaces the RIA instances on the web page (referenced within the script) with inline HTML frames in the web browser. The script also sets the source of the inline HTML frames to a configurable special domain destination URL, and passes the instance identifiers returned by the HTTP (POST) requests as a URL argument. This provides the advantage of cross-domain security, enabling the same-origin policy of the web browser to isolate adapted content from surrounding web pages.

After the web browser has executed the RIA discovery script, the Internet gateway receives HTTP (GET) requests to the special domain URL for each inline HTML frame from the web browser (504). In some embodiments, the HTTP (GET) requests are intercepted by the request monitor, and based on special domain matching, the HTTP proxy redirects the requests to the application server. At the application server, the adaptation engine generates an HTML markup for each inline HTML frame corresponding to an RIA instance (506).

In the exemplary method of FIG. 5, steps 508, 510, and 512 are executed in parallel with steps 500, 502, 504, and 506. At step 508, the adaptation engine sends an HTTP (GET) request to the web server at the URLs of the RIA files (508) via the HTTP proxy. By sending the HTTP (GET) request via the HTTP proxy, transparency of the source IP address (for example, the IP address of the mobile device) can be maintained.

Next, the application server receives the RIA files from the web server via the HTTP proxy (510), and generates a second unique identifier for each RIA file (512), the second unique identifier hereinafter referred to as "content identifier". The content identifier identifies the content of each RIA file that is to be adapted, whereas the instance identifier represents a specific instantiation of each RIA file. For example, an exemplary RIA file can have multiple instantiations (by different users/subscribers), and these instantiations are denoted by multiple instance identifiers. On the other hand, there is only one content identifier for the exemplary RIA file, because the content of the file remains the same even though the file may be instantiated by different users.

After a content identifier has been generated and the HTTP requests for the inline HTML frames have arrived at the adaptation engine, the adaptation engine creates an association between the instance identifiers and the content identifiers (514). The association between the instance and content identifiers could be linked with the association between the RIA file and the instance identifiers mentioned above. The association between the instance and content identifiers could be based on a mapping linking the two identifiers or could be based on separate mapping between the RIA file (or some representation of the RIA file) and the content identifier. For example, adaptation engine 140 could generate a lookup table that maps the instance identifier with the URL of the RIA file, the instance parameters and the content identifiers. The adaptation engine 140 could also generate two lookup tables, with one table having an association between and the instance identifier, the RIA file URL and the instance parameters, and the other table having an association between the RIA file URL and the content identifier.

Next, the adaptation engine generates markup and scripts for each inline HTML frame in an HTTP response (516). The markup and scripts in the HTTP response, when executed in the web browser, can instantiate a web worker to consume the RIA content identified by the content identifiers. The markup can further include references to additional runtime library scripts (for example, scripts that implement common portions of output representation parts of the adapted RIA content, or of a respective virtual machine). In some embodiments, to allow cross-domain requests from within internal inline frames, the HTTP response can carry an appropriate Access-Control-Allow-Origin (CORS) HTTP header.

Next, the adaptation engine sends the HTTP response (containing the markup and scripts) to the web browser via the HTTP proxy (518). After the HTTP response has been received, the web browser displays each inline HTML frame, instantiates a web worker, and retrieves the runtime library scripts (if runtime library scripts have not been previously downloaded).

Subsequently, the Internet gateway receives an HTTP request from the web browser requesting the download of adapted RIA content (identified by the content identifier) from the application server (520).

Returning to FIG. 4, the adaptation engine, in response to the HTTP request of 518, adapts the content of the RIA files for display in the web browser without requiring installation of an RIA player (414). The adaptation service can use web standards, e.g., HTML 5, JavaScript, Scalable Vector Graphics (SVG), Web Apps WG (e.g., Web Workers, XMLHTTPRequest), and Synchronized Multimedia Integration Language (SMIL). As part of the adaptation service, the adaptation engine extracts assets (e.g., multimedia content, such as images, videos, sounds, fonts, etc.) from the RIA files and stores the assets in a browser-friendly format (e.g., GIF, JPEG, PNG, etc.). The adaptation engine can also process bytecode in the RIA files to generate scripts that can utilize runtime libraries. All adapted content can be cached locally (e.g., in a web cache in the Internet gateway) for subsequent re-use, which can minimize access latency and further reduce resource utilization requirements on the Internet gateway.

After the RIA files have been adapted, the adaptation engine provides the adapted content to the web browser on the mobile device (416). The web browser displays the adapted content in the respective inline HTML frame, which can simulate the capabilities of an RIA player and replicate the presentation and interactivity of the RIA files. It is assumed that the adapted content can be supported by the web standards and the capabilities of the web browser.

The exemplary methods described in FIGS. 4 and 5 can be extended to other types of services. For example, in some embodiments, if the RIA files consume video/audio content provided by a media server, the Internet gateway can be supplemented with a multimedia proxy (e.g., multimedia proxy 144 of FIG. 2) to adapt the RIA content. In some other embodiments, the RIA discovery script can roll back to alternate content (provided by the content author) if the adaptation engine in the application server experiences any issue in the processing of any of the application files (e.g., processing a corrupted or invalid application file, etc.).

It is understood that the above-described exemplary embodiments are for illustrative purposes only and are not restrictive of the claimed subject matter. Certain parts of the system can be deleted, combined, or rearranged, and additional parts can be added to the system. It will, however, be evident that various modifications and changes may be made without departing from the broader spirit and scope of the claimed subject matter as set forth in the claims that follow. The specification and drawings are accordingly to be regarded as illustrative rather than restrictive. Other embodiments of the claimed subject matter may be apparent to those skilled in the art from consideration of the specification and practice of the claimed subject matter disclosed herein.

The work that led to the development of the subject matter described herein, was co-financed by Hellenic Funds and by the European Regional Development Fund (ERDF) under the Hellenic National Strategic Reference Framework (ESPA) 2007-2013, according to Contract no. MICRO2-08.

What is claimed is:

1. A method for transparent in-network adaptation of a Rich Internet Application (RIA) content using an Internet gateway, the method comprising:
   receiving a first request for a web page that is configured to be displayed in a web browser on a mobile device;
   communicating with a server to receive a first response to the first request, wherein the first response includes a reference to an RIA file;
   modifying the first response by inserting a reference to an RIA discovery script, wherein the RIA discovery script replaces an RIA instance on the web browser with an inline HTML frame;
   providing the modified first response to the web browser, wherein information from the modified first response triggers an execution of the RIA discovery script;
   receiving, based on the execution of the RIA discovery script, a second request for a Uniform Resource Locator (URL) of the RIA file and parameters used to instantiate the RIA file;
   processing the second request by communicating with a web server to acquire the RIA file and the parameters used to instantiate the RIA file;
   adapting the RIA content of the RIA file for display in the web browser without requiring an RIA player at the mobile device; and
   providing adapted RIA content to the web browser for display within an inline HTML frame.

2. The method of claim 1, wherein the RIA discovery script identifies an attempted instantiation of the RIA file.

3. The method of claim 1, wherein the URL of the RIA file and the parameters used to instantiate the RIA file are included with the second request.

4. The method of claim 1, wherein processing the second request further comprises:
   generating an instance identifier corresponding to the RIA file;
   sending a second response including the instance identifier to the RIA discovery script, which replaces an RIA instance on the web browser with an inline HTML frame referencing the instance identifier and sets a source of the inline HTML frame to a domain destination URL;
   receiving one or more third requests to the domain destination URL for the inline HTML frame; and
   generating a markup corresponding to the inline HTML frame.

5. The method of claim 1, wherein adapting the RIA file for the web browser further comprises:
   adapting the content of the RIA file using web standards.

6. The method of claim 1, wherein the adapted content is cached locally in the Internet gateway.

7. The method of claim 4, wherein the instance identifier for RIA file includes the URL of the RIA file and the parameters used to instantiate the RIA file.

8. The method of claim 4, wherein the domain destination URL is different from a URL of the requested web page.

9. The method of claim 4, wherein processing the second request further comprises:
   communicating with the web server to receive the RIA file; and
   generating a content identifier that corresponds to the content of the RIA file.

10. The method of claim 9, wherein the RIA file is received and stored in a web cache in the Internet gateway.

11. The method of claim 9, wherein processing the second request further comprises:
    creating an association between the instance and content identifiers by generating association information including the content identifier;
    providing the association information to the web browser; and
    receiving a fourth request for the adapted content.

12. The method of claim 11, wherein the association information is markup and scripts.

13. The method of claim 11, wherein the association information instantiates a web worker at the mobile device, wherein the web worker consumes the content of the RIA file corresponding to the content identifier.

14. The method of claim 13, wherein the adapted content is displayed in the inline HTML frame at the web browser.

15. A non-transitory computer readable medium storing instructions that are executable by one or more servers to cause the one or more servers to perform a method for adapting a Rich Internet Application (RIA) content using an Internet gateway, the method comprising:
    receiving a first request for a web page that is configured to be displayed in a web browser on a mobile device;
    communicating with a server to receive a first response to the first request, wherein the first response includes a reference to an RIA file;
    modifying the first response by inserting a reference to an RIA discovery script, wherein the RIA discovery script replaces an RIA instance on the web browser with an inline HTML frame;
    providing the modified first response to the web browser, wherein information from the modified first response triggers an execution of the RIA discovery script;
    receiving, based on the execution of the RIA discovery script, a second request for a Uniform Resource Locator (URL) of the RIA file and parameters used to instantiate the RIA file;
    processing the second request by communicating with a web server to acquire the RIA file and the parameters used to instantiate the RIA file;
    adapting the RIA content of the RIA file for display in the web browser without requiring an RIA player at the mobile device; and
    providing adapted RIA content to the web browser for display within an inline HTML frame.

* * * * *